United States Patent
Kosslow et al.

(10) Patent No.: US 6,765,214 B1
(45) Date of Patent: Jul. 20, 2004

(54) SMART RADIOLOGICAL DOSIMETER

(75) Inventors: William J. Kosslow, Jefferson Hills, PA (US); Gregory S. Bandzuch, Washington, PA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 28 days.

(21) Appl. No.: 10/073,310

(22) Filed: Feb. 13, 2002

(51) Int. Cl.[7] ................................................ G01T 1/14
(52) U.S. Cl. ...................................... 250/376; 250/388
(58) Field of Search ................................ 250/376, 388, 250/484.5, 485.1

(56) References Cited

U.S. PATENT DOCUMENTS

| | | | | |
|---|---|---|---|---|
| 3,878,496 A | * | 4/1975 | Erickson | 250/336.1 |
| 4,301,367 A | * | 11/1981 | Hsu | 250/370.07 |
| 4,461,952 A | * | 7/1984 | Allemand et al. | 250/370.07 |
| 4,642,463 A | * | 2/1987 | Thoms | 250/336.1 |
| 4,697,084 A | * | 9/1987 | Fox | 250/376 |
| 4,733,383 A | * | 3/1988 | Waterbury | 368/10 |
| 5,008,548 A | * | 4/1991 | Gat | 250/372 |
| 5,132,543 A | * | 7/1992 | Valentine et al. | 250/388 |
| 5,572,027 A | * | 11/1996 | Tawil et al. | 250/336.1 |

FOREIGN PATENT DOCUMENTS

JP          07035864 A  *  2/1995  ......... G01T/01/00

* cited by examiner

*Primary Examiner*—Albert Gagliardi
(74) *Attorney, Agent, or Firm*—Julia Cook Moody; Paul A. Gottlieb (57) ABSTRACT

A radiation dosimeter providing an indication of the dose of radiation to which the radiation sensor has been exposed. The dosimeter contains features enabling the monitoring and evaluating of radiological risks so that a user can concentrate on the task at hand. The dosimeter provides an audible alarm indication that a predetermined time period has elapsed, an audible alarm indication reminding the user to check the dosimeter indication periodically, an audible alarm indicating that a predetermined accumulated dose has been prematurely reached, and an audible alarm indication prior or to reaching the ¾ scale point.

9 Claims, 9 Drawing Sheets

ND DEVELOPMENT

SMART RADIOLOGICAL DOSIMETER

STATEMENT REGARDING FEDERALLY SPONSORED RESEARCH AND DEVELOPMENT

The invention described herein was made in the performance of work under a contract awarded by the U.S. Department of Energy. The government has certain rights in the invention.

BACKGROUND OF THE INVENTION

1. Field of the Invention

The invention relates generally to detecting radiation dose, and more specifically to a device for monitoring and evaluating radiological risks.

2. Description of the Prior Art

As a consequence of both the short-term health effects (radiation syndrome) and long-term health effects (a possibility of cancer later in life) of exposure to radiation, certain personnel who may be exposed to such radiation are required to wear radiation measurement devices 1) to measure accumulated dose and 2) to provide indication of accumulated dose while in radiation areas. The first device, a thermoluminescent dosimeter (TLD) is worn on the body, typically between the neck and waist to measure accumulated dose of beta and gamma radiation and must be processed by a dosimetry lab to determine a worker's accumulated dose. A second device, a pocket dosimeter (pocket dosimeter) is typically worn next to the TLD for periodic visual indication of a worker's accumulated gamma dose while in the radiation area. Pocket dosimeters typically measure 0 to 200 mrem, however, some high radiation pocket dosimeters are designed for measuring between 0 and 5 rem.

The pocket dosimeter of the prior art provides a viewing window with a scale (0 to 200 mrem typically) and a slim needle which moves upscale as gamma rays impact the charged sensor device inside. The dosimeter sensor device is fully charged initially to read 0 mrem. As gamma radiation impacts the dosimeter sensor element, the charge slowly dissipates, due to a capacitive discharge effect, and the needle moves to the right indicating a larger and larger accumulated dose.

Personnel may be assigned an "allotted dose" (100 mrem, for example) before entering a radiation area along with a "stay time." The allotted dose is determined by subtracting the worker's accumulated dose to date for that calendar year from the yearly limit assigned to that worker at the beginning of the year and halving that to ensure the yearly limit is not exceeded. The stay time is determined by dividing a worker's allotted dose by the expected exposure while in that area (typically based on the highest exposure rate in that work area). For example, if an individual has an allotted dose of 100 mrem and the work area to be entered has three sources of radiation (20 mrem/hour, 40 mrem/hour, and 100 mrem/hour) then the stay time will be equal to or less than 100 mrem/(100 mrem/hour)=1 hour. The denominator in this calculation is the highest value of the three radiation sources.

To be safe however, some facilities typically assign stay times of about ½ of what is permitted or 30 minutes in the foregoing example. Furthermore, to reduce the possibility of the pocket dosimeter going offscale and not having knowledge of a worker's exposure until after their TLD is processed by the dosimetry lab, some protocols require that certain workers have their pocket dosimeters rezeroed before they exceed ¾ scale or the 150 mrem point on a 0–200 mrem pocket dosimeter. In addition, some personnel are required to check their pocket dosimeter indicator every 10 to 20 minutes while in the radiological area. This requirement ensures that a worker is alerted of a high radiation situation before any radiological health risk is incurred. For example, if an area has a radiation source which emits 100 mrem per hour and the worker's stay time/allotted dose are 1 hour/100 mrem, respectively, then it would be unexpected if after just 15 minutes the worker's pocket dosimeter reads 90 mrem.

Pocket dosimeters of the prior art only provide an indication of accumulated dose and nothing else. Hence, personnel entering a radiation area must not only concentrate on and perform the task at hand, but they must continuously be mindful of the 10-minute interval check, conscious of their assigned stay time, watchful of their assigned allotted radiation dose, and watchful of the ¾ scale point. From experience gained from the use of dosimeters of the prior art, it was considered that an improved radiological dosimeter could be developed to raise the level of safety by reducing the risk of overexposure while enabling improved concentration on work tasks for all radiation workers. Therefore, there is a need for smart dosimeters, which ate dosimeters incorporating dosage-triggered and time-triggered alarm features that allow the user to concentrate on the task at hand.

SUMMARY OF THE INVENTION

The radiation dose monitoring device, or smart radiological dosimeter of the present invention is designed to provide the same visual indication of accumulated gamma dose as pocket dosimeters in current use, with additional enhancements designed to give the radiological worker an extra level of assurance so that the worker can concentrate on the task at hand while the proposed invention takes on the burden of monitoring and evaluating the radiological risks encountered. The smart dosimeter provides and audible alarm indication to the user when their stay time (a predetermined time period) has elapsed, an audible reminder to check their dosimeter indication periodically for abnormal dose accumulation, an audible alarm indication indicating that their dosimeter has prematurely reached a predetermined accumulated dose (an "allotted dose" limit that shouldn't be reached based on their calculated stay time), and a means to ensure an audible alarm indication occurs prior to reaching the ¾ scale point (a limit imposed to preclude the dosimeter from going off-scale).

This invention is an enhanced radiological accumulated dose measuring and monitoring system. It is a highly modified conventional pocket dosimeter instrument which incorporates a mobile miniature photoelectric optical sensor to detect the instant when the dosimeter needle arrives at a specific dose setpoint, a mechanical stop to limit the mobile sensor position to the ¾ scale point, an amplifier and latch circuit to process the optical sensor output signal, a digital counter/timer circuit to indicate specific time setpoints, a small 4-digit LCD display with "stay time" programming pushbuttons, a watch-type battery, a miniature alarm (buzzer), and a reset switch.

In the present invention, these dosimeter features are consolidated into a compact package. The conventional dosimeter radiation sensing element internals are not affected. The optical sensors and miniature electronics of the dosimeter of the present invention are physically isolated from the sensing element components and are packaged in and around the view window end of the conventional dosimeter. In the present invention, these components are isolated from the sensing element because tapping off the charged sensing element signal can render the gamma measurement system inaccurate. Additionally, processing such low level charge signals into useable information requires additional complicated comparative and isolative electronics. The smart dosimeter system components are packaged into a wider flanged bottom in order to aid in anchoring the dosimeter in the worker's pocket and to aid in preventing dosimeters from falling out of pockets.

With regard to package size, only the width of the dosimeter will increase. When workers are required to wear anti-contamination garments, this wider dosimeter can now be located in the flapped pocket adjacent to the conventional pocket dosimeter pocket which should represent no significant inconvenience to the worker. Finally, the proposed dosimeter can still be charged at the charging receptacle end of the dosimeter which is opposite the viewing window end and which is consistent with conventional dosimeter designs.

DETAILED DESCRIPTION OF THE PREFERRED EMBODIMENT

Figure 1:
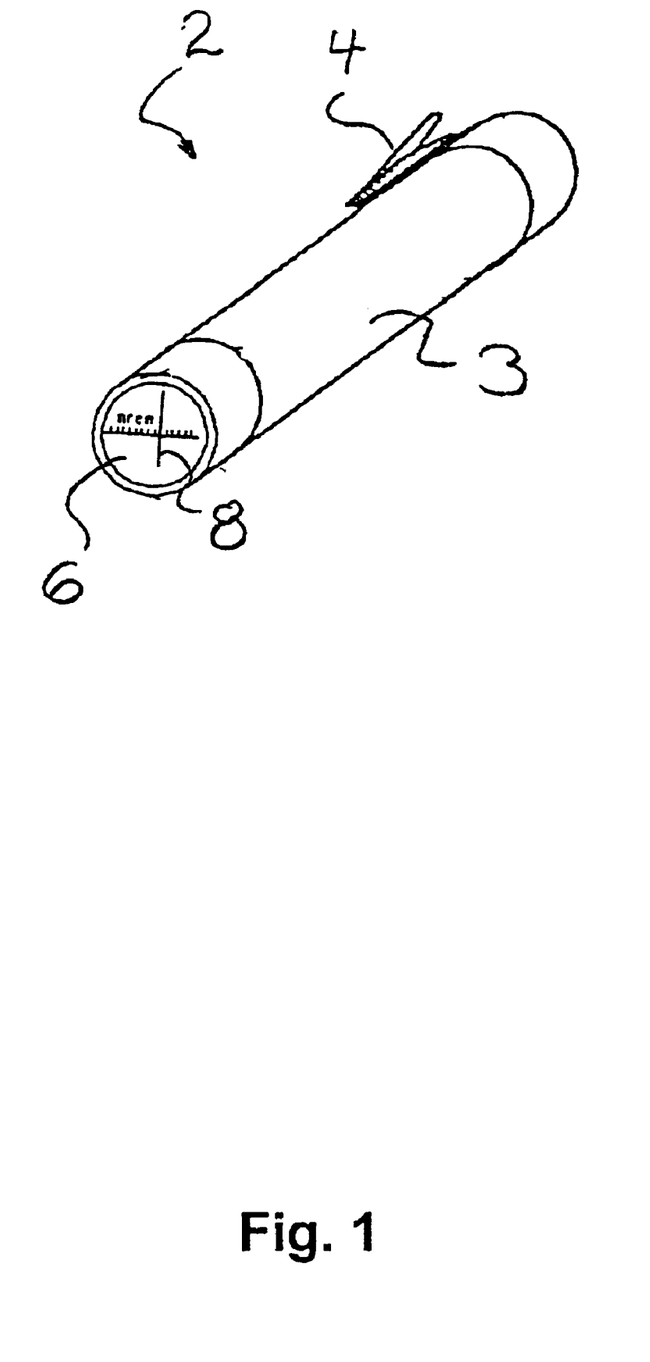
FIG. 1 is a perspective view of a pocket dosimeter according to the prior art.

FIG. 1 is a perspective view of a radiation dosimeter 2 according to the prior art. Dosimeter 2 typically has an exterior surface or casing 3 on which a clip 4 is provided. A scale 6 is also housed in dosimeter 2. An indicator needle 8 is housed in dosimeter 2 and indicates, by its motion in relation to scale 6, the quantity of the accumulated dose.

Figure 2:
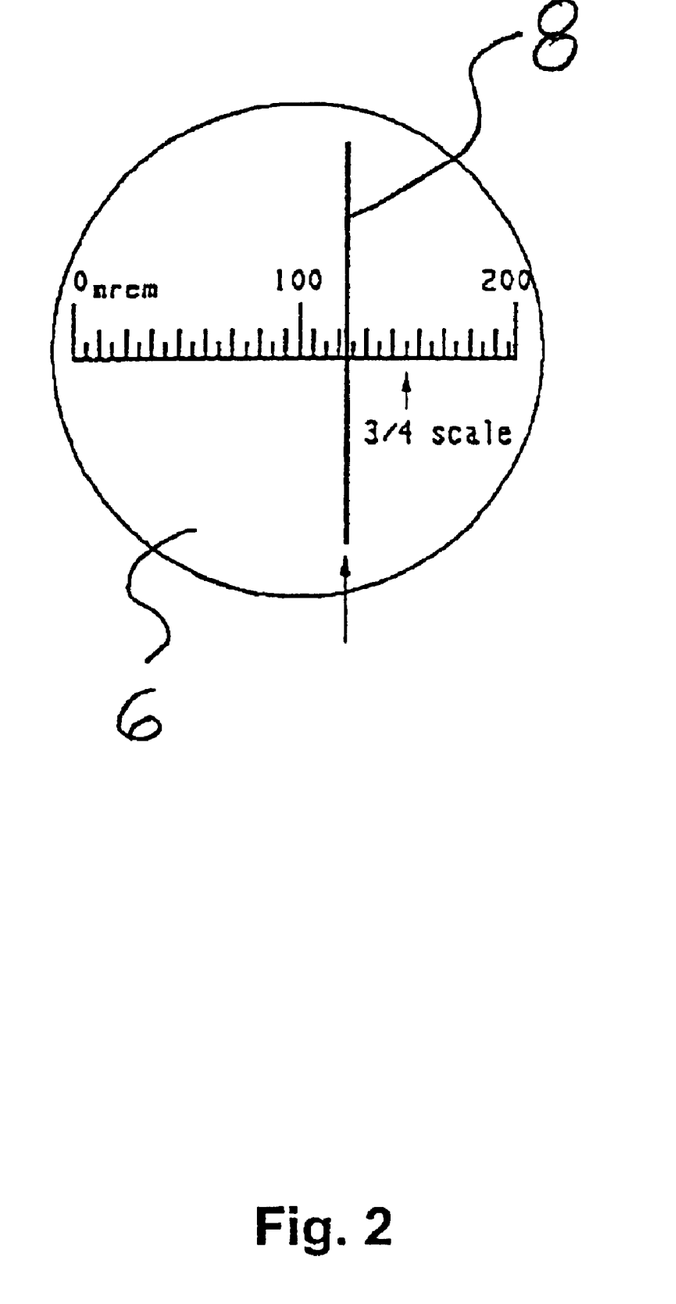
FIG. 2 is a view of the scale of a pocket dosimeter according to the prior art.

FIG. 2 is a view of the scale 6 of a typical radiation dosimeter 2 of the prior art. Exposure levels are indicated on scale 6 in mrem (millirem) by the indicator needle 8.

Figure 3:
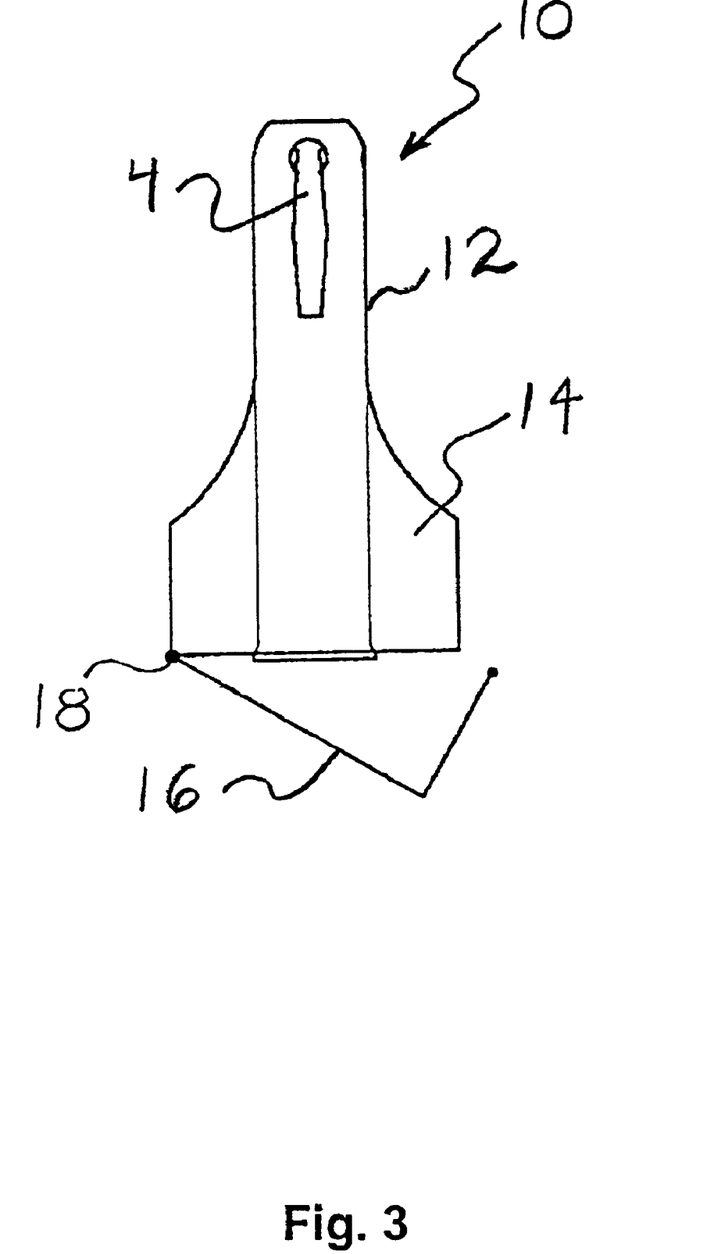
FIG. 3 is a top view of a dosimeter according to the present invention.

FIG. 3 is a top view of dosimeter 10 according to the present invention. Dosimeter 10 typically has an exterior surface or casing 12 on which a clip 4 is provided to permit the device to be attached to a shirt pocket. Protruding from the exterior surface or casing 12 is a flange 14 to aid in anchoring dosimeter 10 to a pocket of the user, and to aid in preventing it from falling through a small opening, such as a bilge grating, in the work environment. Dosimeter 10 is also provided with a cover 16, preferably composed of a clear plastic and preferably attached by means of a hinge 18 to the exterior surface or casing 12, to protect indicators and input devices housed on the exterior surface or casing 12, and to prevent inadvertent button action.

Figure 4:
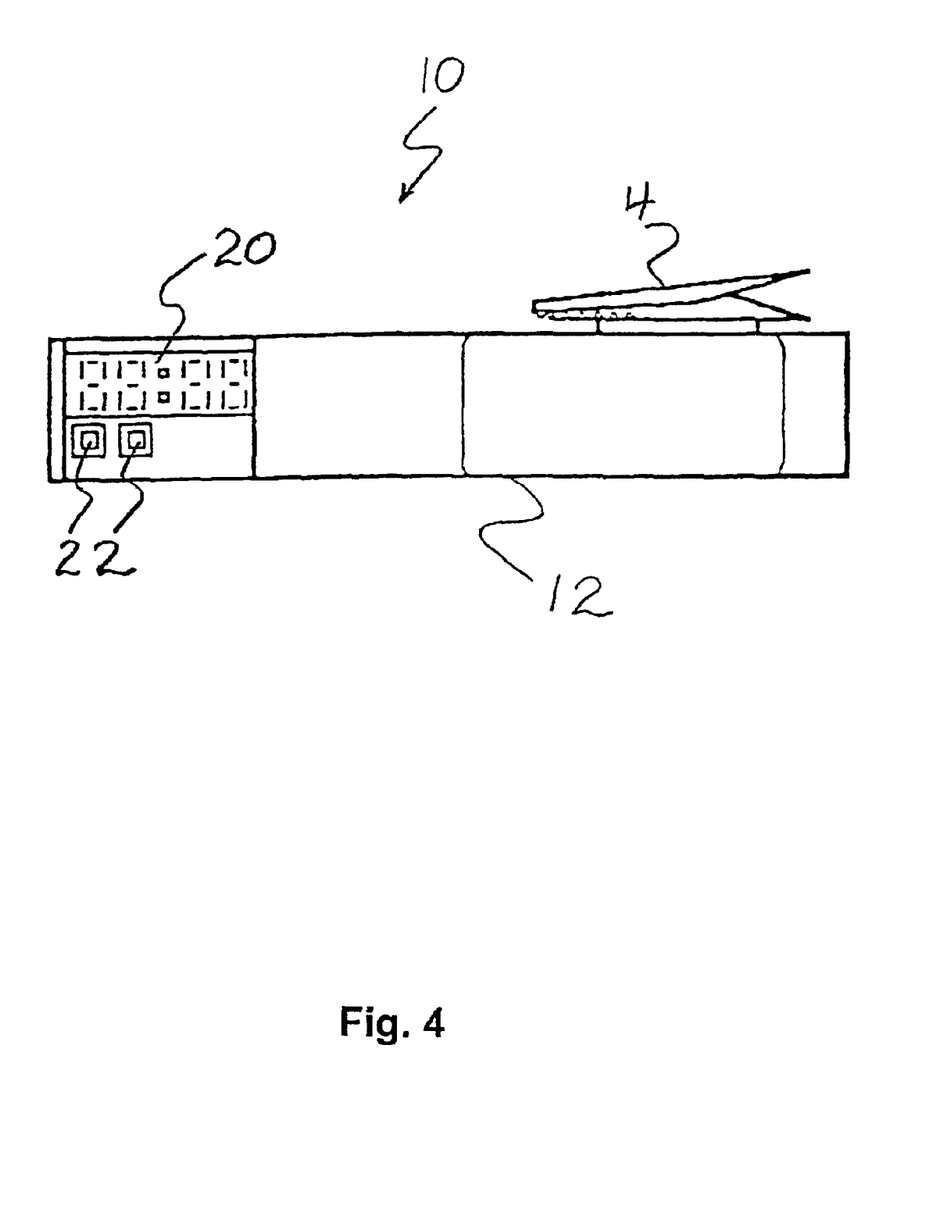
FIG. 4 is a side view of a dosimeter according to the present invention.

FIG. 4 is a side view of dosimeter 10 according to the present invention, showing clip 4, timer and timer display 20 and timer set buttons 22 housed in the exterior surface or casing 12. Typically, timer and timer display 20 includes a digital LED (light-emitting diode) display or LCD (liquid crystal display). Set buttons 22 permit timer and timer display 20 to be set for a desired period of time, referred to as the stay time, and to start the timing function of timer and timer display 20. Timer and timer display 20 is also capable of generating check time signals indicating the need to check dose accumulation.

Figure 5:
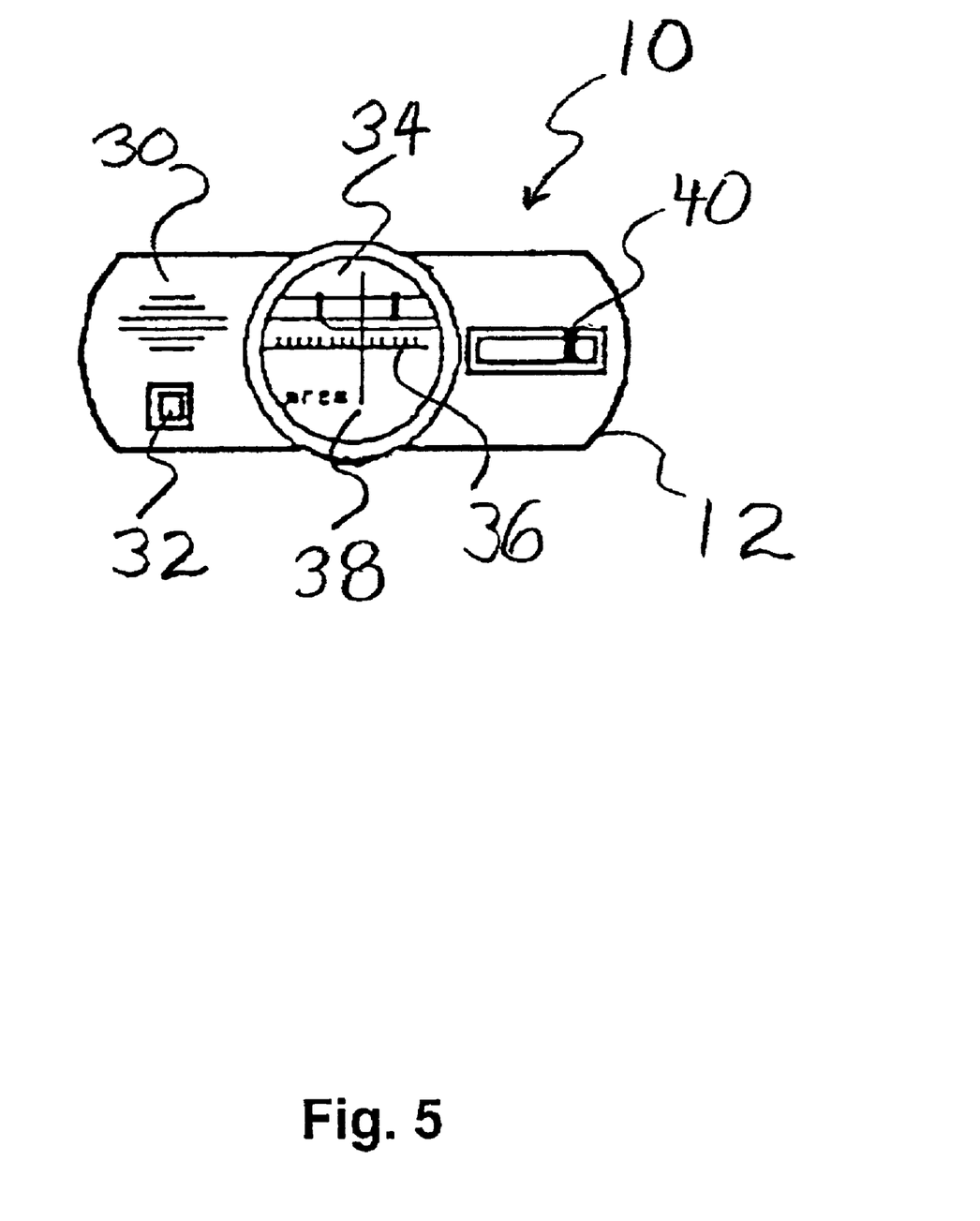
FIG. 5 is a front view of a dosimeter according to the present invention.

FIG. 5 is a front view of dosimeter 10 according to the present invention, showing controls housed on the front. An audible alarm 30 indicates that the stay time has passed, that a check time period has elapsed, or that a dose limit has been reached. A reset button 32 resets the alarm 30. A view window 34 in the exterior surface or casing 12 allows the user to view scale 36. An indicator needle 38 is housed in dosimeter 10 and indicates, by its motion in relations to scale 36, the quantity of the accumulated dose. A dose limit setpoint switch 40 allows the setting of a dose limit setpoint.

Figure 6:
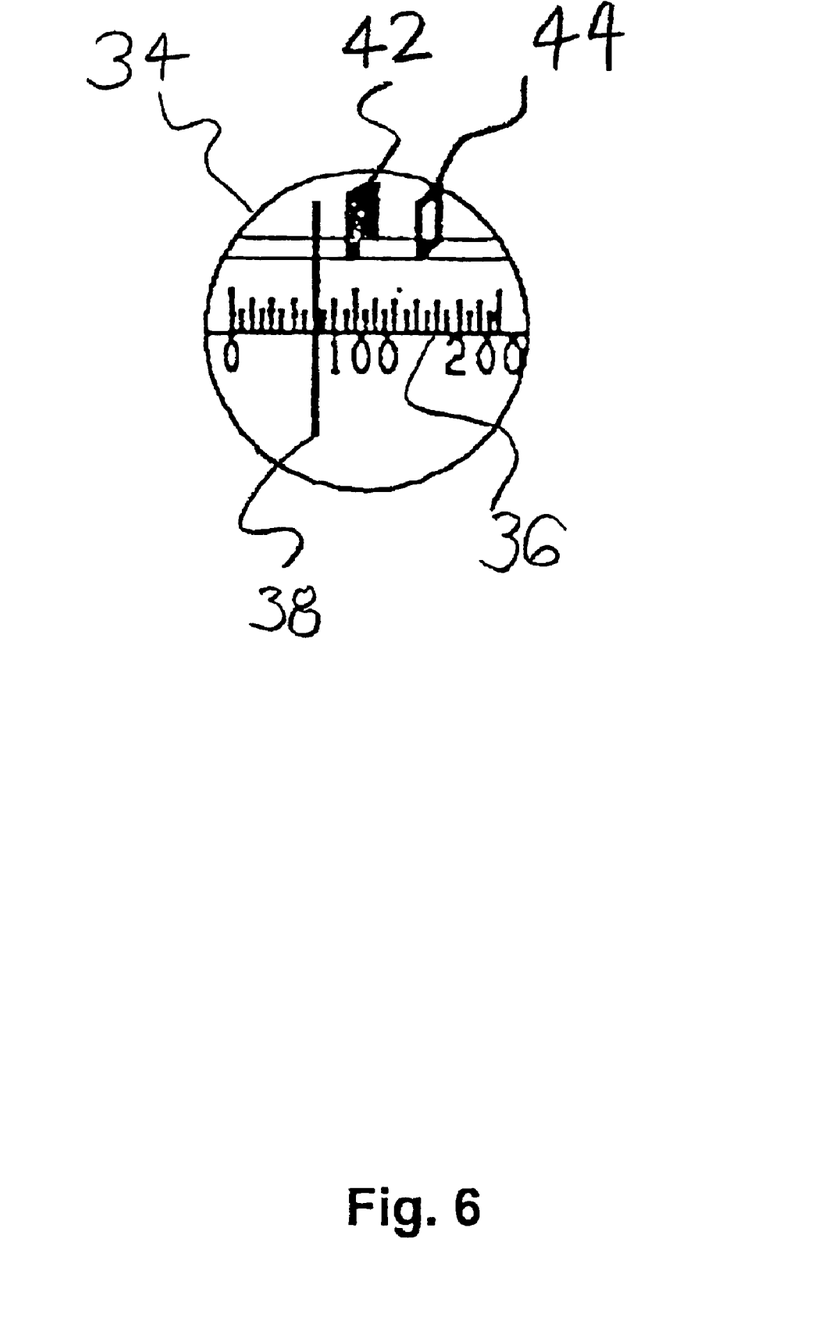
FIG. 6 is a view of the scale of a dosimeter according to the present invention.

FIG. 6 is a view of the display visible through view window 34, including scale 36 and indicator needle 38. A beam and sensor package 42 able to generate a beam, typically an optical beam, and detect its blockage, is movably attached to scale 36 so that it can be moved to a position representing a particular dose. Beam and sensor package 42 is configured so that indicator needle 38 can pass through package 42 and block the beam generated by package 42 when it does so. The blockage of the beam generated by package 42 activates the alarm. A mechanical stop 44, attached to scale 36, prevents the movement of package 42 beyond a position at the top end of scale 36. A preferred position for mechanical stop 44 is a value of three-fourths of the full scale reading.

Figure 7:
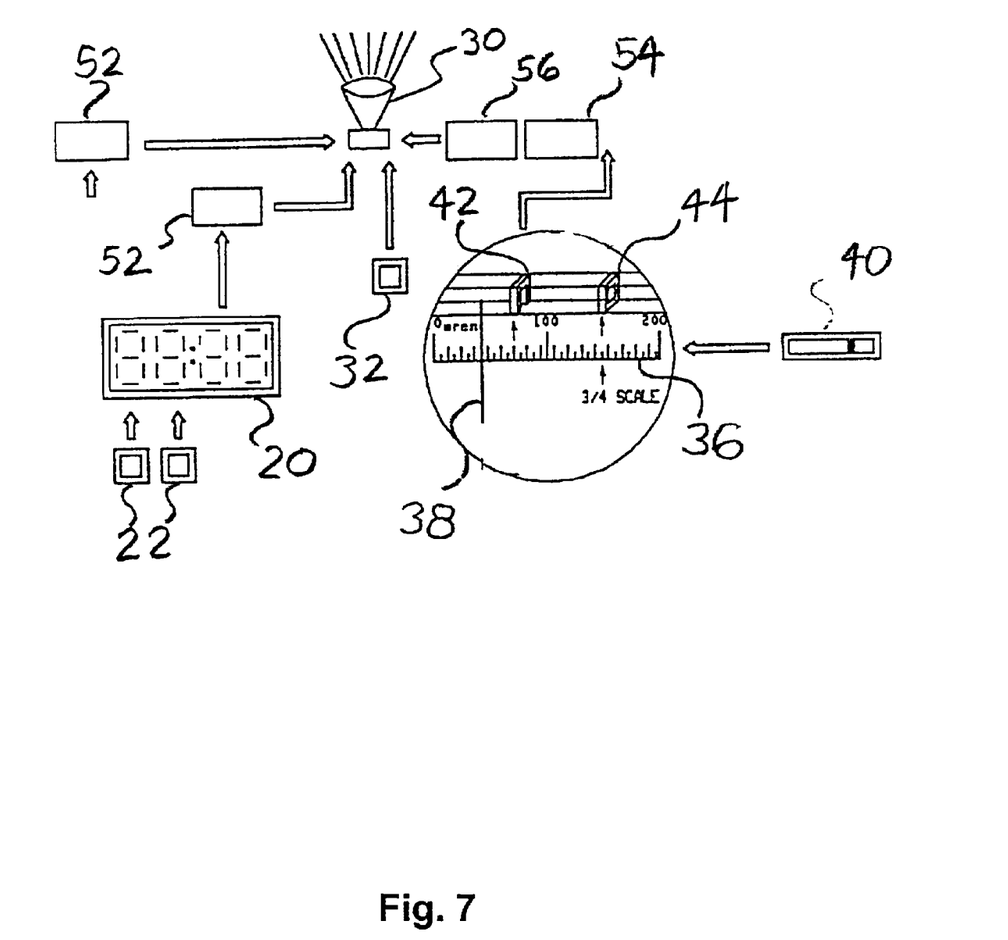
FIG. 7 is a block diagram of a dosimeter according to the present invention.

FIG. 7 is a block diagram of a dosimeter according to the present invention. Timer and timer display 20 makes use of timer/counter circuitry 52 to trigger audible alarm 30 when a stay time, set by set buttons 22, has been exceeded. Timer/counter circuitry 52 also generates a signal output triggering audible alarm 30 each time a predetermined period of time (e.g., 5, 10 or 15 minutes) has elapsed. Reset button 32 resets the alarm. Dose limit setpoint switch 40 is mechanically linked to beam and sensor package 42, enabling the setting of a dose limit setpoint. The dose limit setpoint, represented by the position of sensor package 42 on scale 36, has a maximum represented by the position of mechanical stop 44 on scale 36. The passage of indicator needle 38 through sensor package 42 generates a signal that is amplified by op amp circuitry 54, and results in the generation of a continuous signal by latch circuitry 56 and the triggering of audible alarm 30.

Figure 8:
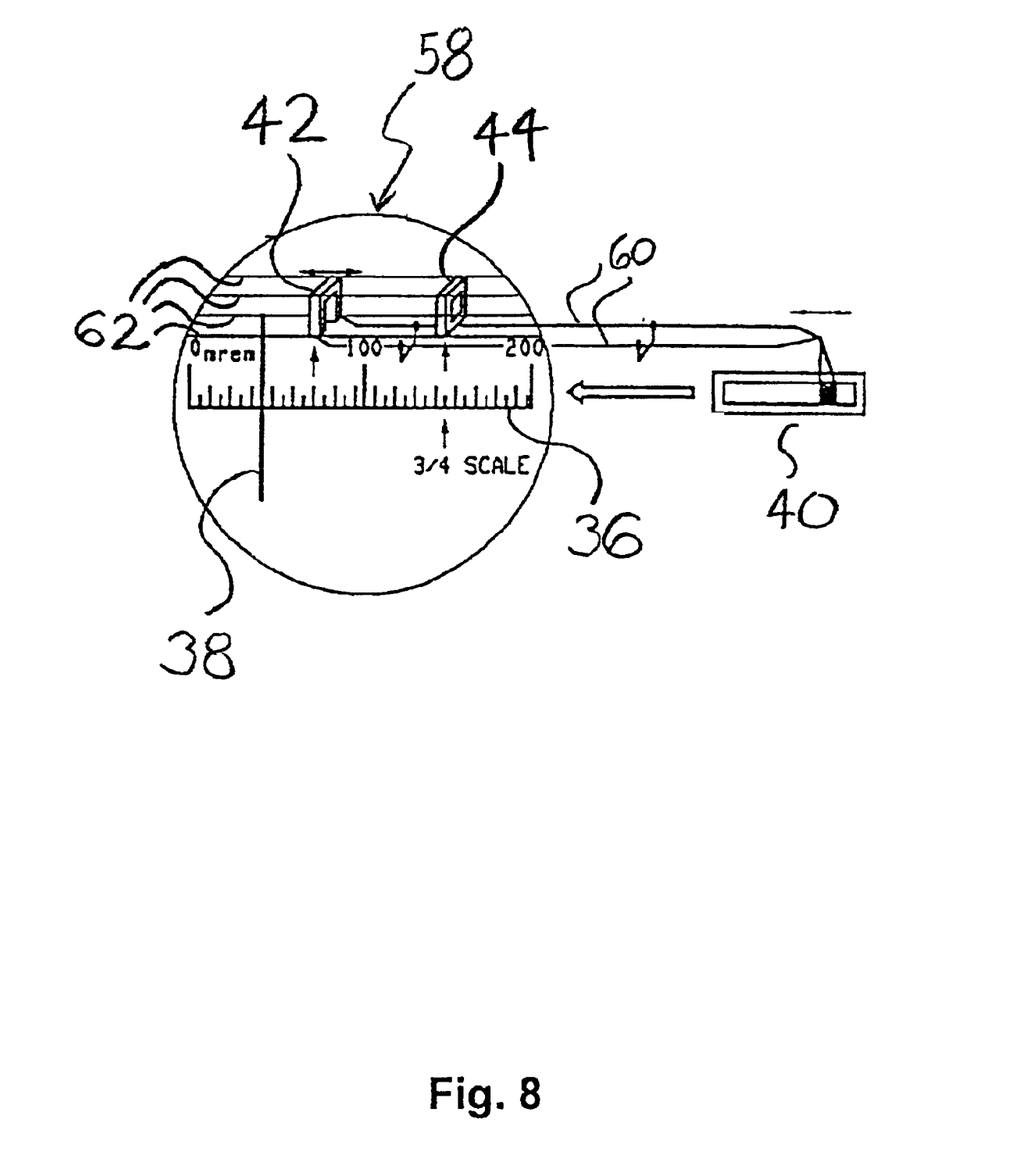
FIG. 8 is a diagram of the mechanical components of the optical sensor assembly according to the present invention.

FIG. 8 is a diagram of the mechanical components of the optical sensor assembly 58 according to the present invention. Dose limit setpoint switch 40 is a sliding switch mechanically linked to sensor package 42 by position wires 60 with the setpoint limited by mechanical stop 44. Wire guides 62, disposed parallel to an edge of scale 36, support sensor package 42 as it slides or moves along scale 36, and provide a stable restraint for position wires 60. Position wires 60 and wire guides 62 are preferably metal, and are arranged so as not to interfere with the motion of indicator needle 38. Alternatively, the position of beam sensor package 42 can be controlled by any other suitable mechanical arrangement, such as an assemblage of gears, a pulley configuration or a rack-and-pinion configuration.

Figure 9:
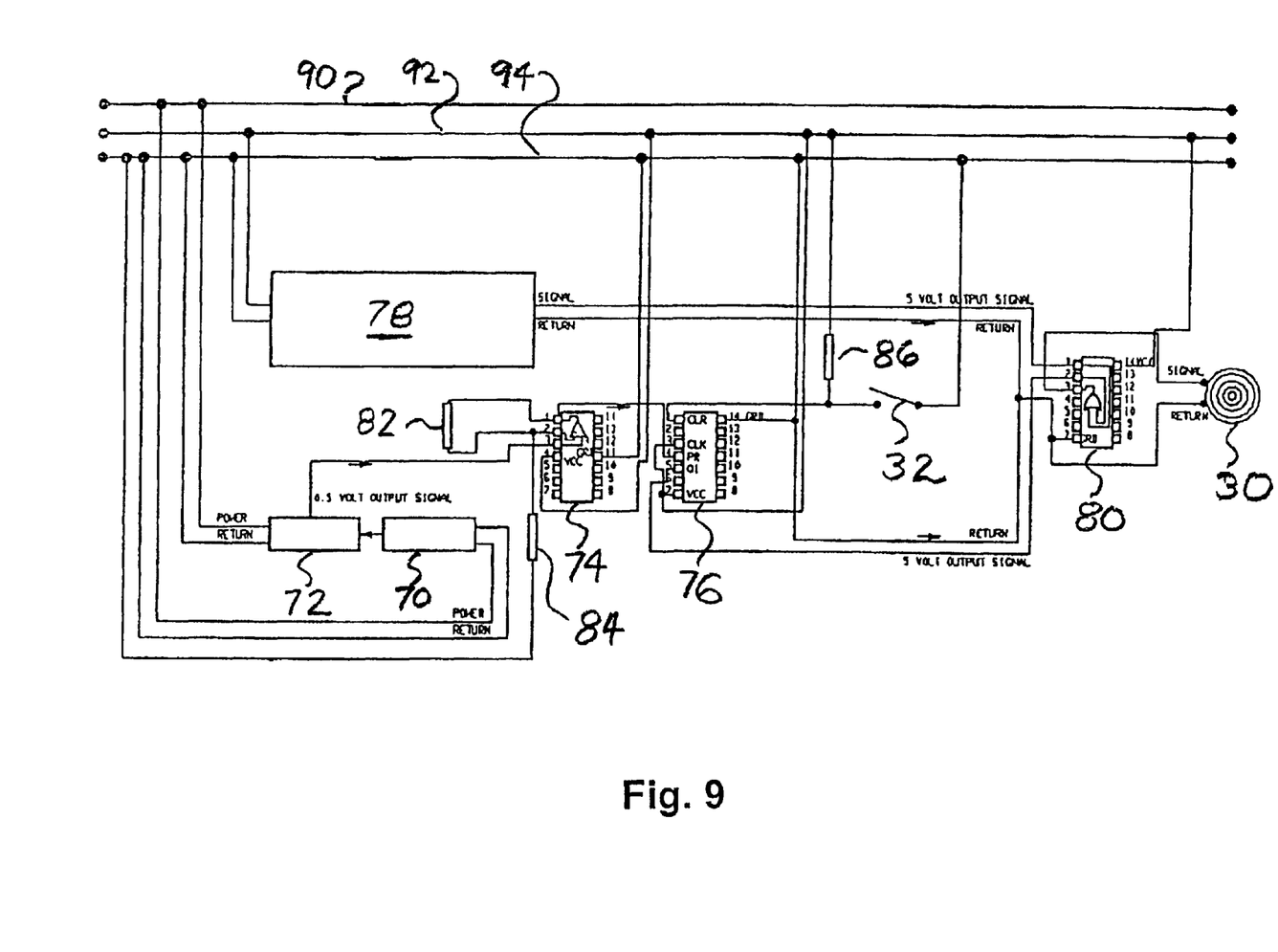
FIG. 9 is an electrical schematic diagram of a dosimeter according to the present invention.

FIG. 9 is an electrical schematic diagram of a dosimeter according to the present invention. Two components of the beam sensor package, a source 70 and a sensor 72, produce and sense a beam, respectively. An output signal generated by sensor 72 is fed to op amp 74, where it is amplified so that it may be used in a logic circuit. The output of op amp 74 is fed to flip-flop latch 76 so that any signal generated by op amp 74 produces a high output signal from flip-flop latch 76. A timer counter and LCD display with a timeset push button module 78, which contains the timer, timer display, and timer set buttons, generates high output signals each time a predetermined period of time has elapsed, and when the predetermined stay time has been reached. A two-input "or" gate 80 receives signals from flip-flop latch 76 and module 78; a high output signal received from either flip-flop latch 76 or module 78 induces two-input "or" gate 80 to generate a signal to sound alarm 30. Reset button 32 resets the alarm. Resistors 82, 84 and 86 provide regulation functions. Power buses 90 and 92, and aground 94 provide the power supply to the devices in the dosimeter. Alarm 30 may also be configured to indicate and respond audibly to a low voltage on buses 90 and 92, providing an indication that a supply battery or other power source powering the circuit has run low.

In use, dosimeter 10 is initialized so that indicator needle 38 shows a zero reading on scale 36. Sensor package 42 is set at the desired dose limit setpoint value on scale 36. Timer and timer display 20 is initialized by means of timer set buttons 22 so that alarm 30 will sound when the stay time has been exceeded. During the exposure period, the user is reminded, by the sound of alarm 30 as each check time period passes, to check the exposure indicated by indicator needle 38. Alarm 30 also sounds if the dose limit setpoint value is exceeded.

FIG. 7 provides a block diagram of the components and signal paths needed to make the smart dosimeter operate as intended. The programmable LCD display, the digital timer/counter circuitry, and the miniature alarm, make up a system that provides an audible alarm to the worker every 10 minutes indicating that their pocket dosimeter should be visually checked. The same components are used to provide an audible alarm that a worker's stay time has elapsed. The mobile sub-miniature photoelectric optical sensor, which can be positioned via a mechanically coupled sliding switch, provides an audible alarm to the worker when the maximum allotted dose limit has been reached. A mechanical stop fixed at the ¾ scale position prevents the mobile optical sensor from being set at a point higher than the imposed ¾ scale limit. If the optical sensor can not be positioned past this point, an audible alarm will occur at some point before the dosimeter indication exceeds the ¾ scale limit (either at the allotted dose setpoint or the ¾ scale setpoint). When tripped, the dosimeter's audible alarm is active until it is intentionally reset by the user. A reset button is provided which cuts off the alarm output even though the alarm "condition" may still exist. A hinged, clear plastic cover prevents the worker from inadvertently depressing the reset button, depressing and altering the stay time set, or altering the mobile "allotted dose" optical sensor position. This plastic cover is spring loaded to default to a closed position. The sliding switch and mechanical components making up the mobile optical sensor are intentionally hard to move (a physical resistance is incorporated) so that vibration or shaking of the proposed dosimeter does not cause the mobile optical sensor to move to a non-conservative position.

FIG. 8 shows an enlarged view of the mechanical components of the proposed dosimeter design. As the sliding switch is physically moved, the mobile miniature photoelectric sensor will follow in a 1:1 displacement via metal positioning wires. The wires are physically constrained by wire guides.

The radiation levels to which the dosimeter is expected to be exposed should be consistent with those required for personnel safety as observed in reactor compartments when the reactor is shut down (background radiation levels) and temperatures typically no higher than 120° F. Typically, radiation-hardened electronics are only needed when the components of an electronic system are to be operating in a reactor compartment with the reactor at power (an environment that has a high level of neutron radiation in addition to high levels of gamma rays and alpha particle radiation). Because the effect due to radiation on the smart dosimeter electronics is likely to be minimal, standard commercial grade, rather than radiation hardened military grade, electronics can be used to keep costs down. Regarding ambient temperatures, most electronic components, integrated circuits included, can operate between −55° C. and 125° C., so the 70 to 120° F. ambient range typically encountered in reactor compartments is well within the operating range of the electronic components proposed.

FIG. 9 is an electrical schematic of the circuit constructed to serve as the smart dosimeter prototype. The circuit was constructed on a protoboard and powered by a miniature 12-volt A23 size battery and a miniature 5-volt watch battery. The protoboard used is 7" wide by 7" long. An off-the-shelf Seeka GTL1N photoelectric light source and light sensor (0.25" by 0.5" by 1.0" in size) capable of detecting a 22-American Wire Gauge size wire passing between the modules was procured and mounted on the board to provide the proof-of-principle intended. Smaller and more accurate optical sensors which are compatible with the prototype circuitry are available. The Seeka optical sensors were powered off of the 12-volt battery. The optical sensor provides a 0.5 volt output signal when an object is detected. When the object has passed through the sensor modules, the output signal goes to zero volts. This sensor output signal is amplified with a 10× LM124 operational amplifier circuit and then latched with an LS74 flip-flop circuit to provide the alarm buzzer with a constant 5-volt DC signal that is latched high so that the alarm continues sounding even though the optical sensor signal has returned to zero volts. A reset switch is incorporated into the latch circuit to provide a method for the user to acknowledge and shut off the alarm. An off-the-shelf Mallory MCP320B2 alarm buzzer, which operates off of a 5-volt input, is used to function as the buzzer in the prototype. With regard to the time-based alarm circuitry, an off-the-shelf counter/timer with LCD display module is incorporated to provide an audible signal when a worker's stay time is reached and when the 10-minute check interval is reached. These times can be set with the set-buttons provided and activated by depressing the start button. The output signals from the timer/counter circuitry and the optical sensor circuitry are then "OR"ed by the use of an LS 32 logic "OR" gate such that a high output signal from either circuit will trip the alarm.

What is claimed is:

1. A radiation dosimeter comprising:

a timer, a scale, a dose indicator indicating dose accumulation on the scale, and a sensor disposed on the scale such that the proximity of the dose indicator produces an indication of a predetermined dose.

2. The radiation dosimeter of claim 1, wherein the sensor is an optical sensor accommodating, and reacting to, the passage of the dose indicator.

3. The radiation dosimeter of claim 1, wherein the sensor is movably disposed on the scale.

4. The radiation dosimeter of claim 1, wherein the scale has a zero end and a full scale end, further comprising a mechanical stop located on the scale between the sensor and the full scale end, restricting the motion of the sensor to the portion of the scale between the zero end and the mechanical stop.

5. The radiation dosimeter of claim 4, wherein the mechanical stop is located about ¾ of the distance on the scale from the zero end of the scale.

6. The radiation dosimeter of claim 1, wherein the timer provides a stay time signal after the passage of a stay time and provides check time signals after the passage of each of at least one consecutive check time period.

7. The radiation dosimeter of claim 6, wherein the stay time signal and check time signals produce an audible alarm.

8. The radiation dosimeter of claim 1, further comprising:
a low voltage indicator producing an audible indication of low voltage.

9. The radiation dosimeter of claim 1, further comprising:
an exterior casing comprising a top end and a bottom end, wherein the bottom end is flanged.

* * * * *